(12) United States Patent
Rogers et al.

(10) Patent No.: US 8,445,048 B2
(45) Date of Patent: May 21, 2013

(54) PROCESS OF MANUFACTURING RAPID RECONSTITUTION ROOT VEGETABLE PRODUCTS

(76) Inventors: David Rogers, Florenceville (CA); Michael Sahagian, Carlow (CA)

(*) Notice: Subject to any disclaimer, the term of this patent is extended or adjusted under 35 U.S.C. 154(b) by 545 days.

(21) Appl. No.: 11/943,379

(22) Filed: Nov. 20, 2007

(65) Prior Publication Data
US 2008/0138479 A1    Jun. 12, 2008

Related U.S. Application Data

(63) Continuation-in-part of application No. PCT/CA2006/000819, filed on May 19, 2006.

(60) Provisional application No. 60/682,834, filed on May 20, 2005.

(51) Int. Cl.
*A23L 1/01* (2006.01)
*A23L 1/217* (2006.01)

(52) U.S. Cl.
USPC .......................... 426/438; 426/465

(58) Field of Classification Search
USPC ................................. 426/438, 465
See application file for complete search history.

(56) References Cited

U.S. PATENT DOCUMENTS

| | | | |
|---|---|---|---|
| 3,397,993 A | 8/1968 | Strong et al. | |
| 3,635,729 A | 1/1972 | Englar et al. | |
| 3,649,305 A | 3/1972 | Wilder | |
| 4,073,952 A | 2/1978 | Standing et al. | |
| 4,590,080 A | 5/1986 | Pinegar | |
| 4,761,294 A * | 8/1988 | Hamann et al. | 426/438 |
| 5,084,291 A | 1/1992 | Burrows et al. | |
| 5,279,840 A | 1/1994 | Baisier et al. | |
| 5,302,410 A * | 4/1994 | Calder et al. | 426/637 |
| 5,753,291 A | 5/1998 | Pederson et al. | |
| 5,885,639 A | 3/1999 | Judkins et al. | |
| 5,972,397 A | 10/1999 | Durance et al. | |
| 6,033,697 A | 3/2000 | Judkins et al. | |
| 6,548,093 B1 | 4/2003 | Collinge et al. | |
| 6,989,167 B2 * | 1/2006 | Howie et al. | 426/20 |
| 2005/0089617 A1 | 4/2005 | Unwin | |
| 2005/0092623 A1 | 5/2005 | Cuomo | |
| 2005/0266144 A1 | 12/2005 | Hamann et al. | |
| 2006/0177544 A1 | 8/2006 | Sloan | |

FOREIGN PATENT DOCUMENTS

| | | |
|---|---|---|
| KR | 30049301 | 6/2003 |
| WO | WO 86/04218 | 7/1986 |
| WO | WO 98/03085 | 1/1998 |
| WO | WO 00/25605 | 5/2000 |

OTHER PUBLICATIONS

Kita, A. et al., Effective ways of decreasing acrylamide content in potato crisps during processing. J. Agric. Food Chem. 2004, 52, 7011-7016.*

Kita et al., (2004) Effective Ways of Decreasing Acrylamide Content in Potato Crisps during Processing. *Journal of Agricultural and Food Chemistry*, 52(23):7011-7016.

* cited by examiner

*Primary Examiner* — D. Lawrence Tarazano
*Assistant Examiner* — Jerry W Anderson
(74) *Attorney, Agent, or Firm* — Bereskin & Parr LLP/S.E.N.C.R.L., s.r.l.; Noel Courage

(57) ABSTRACT

The invention relates to a method for producing vegetable products from blanched vegetables, comprising:
par frying the blanched vegetables at a par frying temperature and
next applying heat and humidity for drying the vegetables.

34 Claims, 6 Drawing Sheets

PROCESS OF MANUFACTURING RAPID RECONSTITUTION ROOT VEGETABLE PRODUCTS

CROSS-REFERENCE TO RELATED APPLICATIONS

This application is a continuation-in-part of PCT application no. PCT/CA2006/000819 filed May 19, 2006, which claims priority from U.S. provisional application No. US60/682,834 filed May 20, 2005, which are incorporated herein by reference in their entirety.

FIELD OF THE INVENTION

The invention relates to processes of producing quick frying root vegetable products. In particular, the invention relates to quick frying potato products that can be cooked to produce a product having potato flavour and reduced colour variation.

BACKGROUND OF THE INVENTION

Frozen, partially fried root vegetable products that only require a short period of further cooking before serving are widely available and used in both the food service markets and consumer markets. Such products are generally referred to as par fried products. Par fried root vegetable products are typically made from root vegetables such as potatoes, yams, carrots, beets, yucca and sweet potato. The most common par fried root vegetable products are made from potatoes (par fried potato products). Due to the large market for par fried products, there is a constant demand for better products and improved methods for producing such products.

One desired improvement is the reduction of reconstitution (ie. final cooking) time from the par fried product to the finished product to be eaten by the consumer. The fastest method for reconstitution is by frying. However, there is still a desire to reduce this finish frying time further to improve process efficiencies while maintaining, or improving, final product characteristics.

The purpose of the finish fry step is to cook the par fried product, for example, by browning the product and removing moisture from the par fried product to an extent that the par fried product acquires the texture and other properties of the cooked product. A par fried product having a higher moisture content entering into the finish frying step, will require a longer finish frying time to remove moisture and produce a consumable product with desired properties.

A number of solutions have been proposed to reduce the moisture content of the final par fried product and thus reduce the finish frying time.

In general, prior methods for reducing the moisture content of par fried potato products focused on the use of the frying process. Frying provides an even and consistent method of heat transfer because the oil is in full contact with the entire surface area of the immersed potato pieces. Furthermore, the frying process permits a very fast rate of heat transfer to the potato pieces. Frying is considered desirable in a plant setting to ensure a rapid production rate.

For example, one method for further reducing the moisture content of par fried potato products is by extending the par frying time. However, for potato products, excessive par frying causes loss of volatiles leading to degradation of potato flavour. It also caramelizes the sugar on the potato surface which causes colour change, and creates mottling and variation, which are coloured spots or blotches of colour caused by the scorching of the potato surface from the hot frying temperatures.

Another example of a method for further reducing the moisture content of par fried potato products is a two-step par fry method which reduces the moisture content of the potato product in two discrete frying steps such as in U.S. Pat. No. 5,753,291 to Pederson et al. Typically, the two-step par fry method allows greater moisture removal than is achievable in a conventional single par fry step of the same overall frying time. However, the two-step par fry method does not avoid all of the negative effects of extended par frying. Further, a two-step par fry method is inefficient because it reduces the line rate in the factory (i.e. the rate of production of product), requires more equipment and the use of more oil for heating. The inefficiencies of the process increase the effort and time required to produce the products. As well, a third frying step subjects the product to additional heat necessary to finish fry (cook) the product.

A further example of a method for reducing the moisture content of par fried potato products is a two-step par fry process with an intermediate freezing step (fry-freeze-fry) as disclosed for example in U.S. Pat. No. 4,590,080 to Pinegar and U.S. Pat. No. 6,548,093 to Collinge et al. The fry-freeze-fry process is another example of a process that attempts to reduce the negative effects of extended par frying. The fry-freeze-fry process has the advantages of increased moisture removal of a two-step par fry process. It also reduces the negative effects of the second par fry by freezing the product after the first par fry. When the frozen product enters the second par fry, a substantial initial portion of the second par fry step is required to thaw and reheat the frozen product back to frying temperature whereby the product is actually maintained at frying temperature for a substantially shorter time period. The reduced time that the product is subjected to frying temperatures reduces the negative effects of frying. However, a fry-freeze-fry process has similar inefficiency problems as the two-step process described above. The fry-freeze-fry process also produces potato products that tend to lack flavour and have more variability in texture and quality.

Equilibration is another technique used for reducing the negative effects of frying. The equilibration step is typically used after an initial drying step that involves applying heat to the product to dry it. This initial drying step precedes par frying. The equilibration step is a resting step where the moisture from the center of the cooling product is allowed to rehydrate the surface of the product. The surface is typically drier from being closer to the heating source. The negative effects of extended par frying are reduced when the product has been equilibrated in this manner prior to par frying. Equilibration decreases the moisture difference between the surface and the center of the product which reduces case hardening or effects of excessive drying. The equilibration step typically involves resting the product on a conveyor for 1-5 minutes at ambient temperature or circulating unheated air over the product for 1-5 minutes. Equilibration would usually provide less than 0.5% weight loss/minute, and this rate would decrease as the product cooled. Equilibration has also been used between two frying steps (fry-equilibrate-fry process) to produce high solids French fries, typically in excess of 45% solids. Conventional French fries have solids of less than 36% so in a process to produce high solids French fries, the second fry would typically increase solids from less than 36% to 45% or higher.

There is a need for an improved method for producing par fried products that have a more rapid reconstitution time and maintain or improve upon the quality, texture and appearance of a conventional reconstituted product.

SUMMARY OF THE INVENTION

The invention relates to a method for producing rapid reconstitution root vegetable products (ie. products capable of rapid reconstitution) from par fried root vegetables. According to the methods, the root vegetables are dried to a predetermined degree after they have been par fried, so that the drying produces the rapid reconstitution root vegetable products. This invention provides the first time that root vegetables have been dried after par frying with the conditions described herein. In a preferred embodiment, the invention relates to methods of producing French fries and other potato products. The drying step preferably comprises actively drying the root vegetable products by applying conditions such as heat and humidity to the root vegetable products after they have been par fried (typically immediately after par frying). Other parameters such as pressure may also be increased or decreased as desired. The invention also includes rapid reconstitution root vegetable products, such as rapid reconstitution French fries, prepared according to a method of the invention. Thus, the invention also includes rapid reconstitution root vegetable products with unique physical properties as described in this application, such as a percentage weight loss permitting cooking (finish frying) in 90 seconds or less, preferably 60 seconds or less.

The invention also relates to a method for producing rapid reconstitution root vegetable products from blanched root vegetables, comprising
  par frying the blanched root vegetables; and
  next drying the root vegetables to produce the rapid reconstitution root vegetable products.

In one embodiment, the invention relates to a method for producing rapid reconstitution root vegetable products from blanched root vegetables, comprising
  par frying the blanched root vegetables at a par frying temperature and
next applying heat and humidity for drying the root vegetables to produce the rapid reconstitution root vegetable products.

The method also optionally includes freezing and/or finish frying the vegetable products. The vegetables are optionally dried at a moisture removal rate comprising between 0.8-3% weight loss per minute. The moisture removal rate optionally comprises between 0.8-2% weight loss per minute or between 1-1.5% weight loss per minute. The vegetables are optionally dried at a dehydrating temperature that is lower than the par frying temperature, for example, the dehydrating temperature is optionally between 50° C. to 120° C., such as between 55° C. to 70° C. The dehydrating temperature is typically suitable to remove moisture and cause weight loss in the vegetables without browning the vegetable surfaces or volatilizing or degrading organic flavour components and causing loss of natural potato flavor. The relative humidity or absolute humidity is typically suitable to permit moisture removal in a controlled manner from the vegetables without case hardening of the vegetables. The humidity is optionally between about 40% to 80% relative humidity, such as between about 60% to 75% relative humidity. The drying step optionally reduces the weight of the vegetables to produce vegetable products that have a weight that is 5-25% less than the weight of the vegetables at the start of the drying. The vegetable products optionally have a weight that is 10-20% less than the weight of the vegetables at the start of the drying. The vegetable products optionally have a total weight loss after the post-fry drying between 30-75%, 40-75%, 50-75%, 60-75%, 65-75%, 68-72%, or 70-75% (for example, at least: 40%, 50%, 60% or 70%). The vegetables are optionally selected from the group consisting of potatoes (eg. French fries) yams, carrots and beets. The par frying step optionally reduces the weight of the vegetables by 15-30% compared to the weight of the vegetables at the start of the par frying step. The par frying step typically comprises frying the potatoes in oil for about 35-55 seconds at 180-185° C. In certain embodiments, the drying comprises applying heat by blowing heated air on the vegetables or the drying comprises applying heat by blowing a heated convection air current on the vegetables. The drying step optionally comprises applying heat by blowing a first air current and a second air current on the vegetables, wherein the first air current and the second air current are blown in alternate directions. The drying step optionally further comprises turning the vegetables while applying heat. In certain embodiments, turning the vegetables comprises moving the vegetables from a first conveyor belt to a second conveyor belt. In methods of the invention, the drying is typically free of frying of the cut potatoes. The methods optionally further comprise finish frying the vegetable product in oil to produce a cooked vegetable product. The finish frying optionally comprises reducing the moisture content of the vegetables to cause a weight loss of 10-40% relative to the weight of the vegetables at the start of the finish frying step. The finish frying step optionally comprises frying the cut potatoes in oil for about 60-75 seconds at 180-185° C. The finish frying step is optionally preceded by freezing the vegetables or the post-fry drying step is optionally preceded by freezing the vegetables. In certain embodiments, the vegetables, such as French fries, are frozen prior to the post-fry drying step and then refrozen after the post-fry drying step, prior to finish frying.

Another embodiment of the invention relates to a method for producing rapid reconstitution root vegetable products from root vegetables, comprising
  blanching the root vegetables;
  optionally pre-fry drying the vegetables
  par frying the blanched root vegetables at a par frying temperature; and
  next applying heat and humidity for drying (post-fry drying) the root vegetables to produce the rapid reconstitution root vegetable products.
Suitable conditions for the pre-fry drying step, the blanching step, the par frying step and the post-fry drying step are described below. The method also optionally includes freezing and/or finish frying the vegetables as described herein.

Another embodiment of the invention relates to an apparatus for preparing rapid reconstitution root vegetable products from root vegetables comprising:
  a blancher for blanching the root vegetables;
  a par fryer for frying the blanched root vegetables; and
  a post-fry dryer.

In the apparatus, the post fry dryer optionally comprises a means for applying heat and humidity to the vegetables and turning the vegetables. The apparatus optionally further comprises a pre-fry dryer Other features and advantages of the present invention will become apparent from the following detailed description. It should be understood, however, that the detailed description and the specific examples while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

Embodiments of the invention will be described in relation to the drawings in which.

DETAILED DESCRIPTION OF THE INVENTION

Figure 1A:
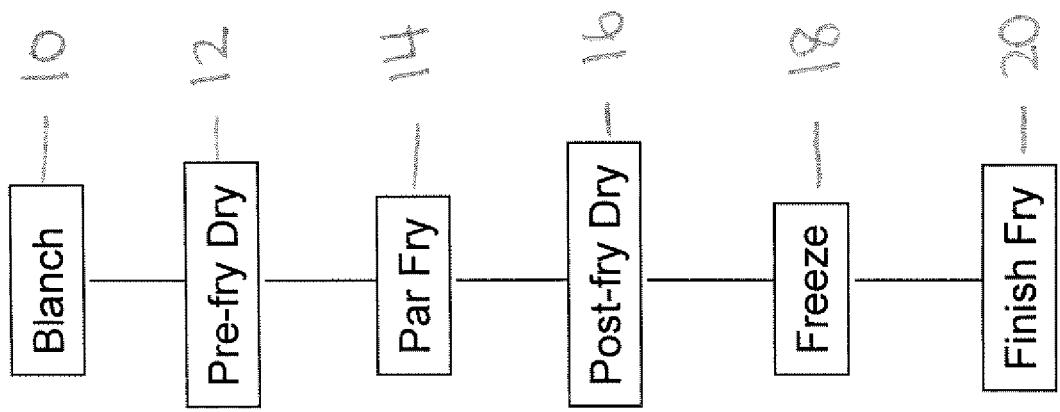
FIGS. 1a-d are block diagrams illustrating embodiments of the process for preparing par fried root vegetable products in accordance with the present invention; a) shows a block diagram of an embodiment of the invention showing consecutive process steps such as blanching, pre-fry drying, par frying, post-fry drying, freezing and finish-frying; b) shows a process of the present invention without the pre-fry drying step; c) shows a block diagram of one embodiment of the process of the present invention without the freezing step; d) shows a block diagram of the process of this embodiment of the present invention where the par frying step and freezing step are carried out prior to the post-fry drying step.

The invention relates to methods for preparation of rapid reconstitution root vegetable products. The invention is useful for food service restaurant and retail fried root vegetable products.

The invention also includes an apparatus for preparation of rapid reconstitution root vegetable products. Components useful to practice the invention include: a blancher, a parfryer and a post-fry dryer. In one embodiment, the apparatus consists of a washer, peeler and cutter for the potatoes as well as a blancher (e.g. screw blancher, belt blancher or steam blancher), a pre-fry dryer (e.g. multi-stage or single-stage dryer or impingement dryer), a parfryer (e.g. oil immersion fryer or deluge fryer), a post-fry dryer (e.g. multi-stage or single-stage dryer or impingement dryer) and a freezer. The parfryer is optionally a conventional parfryer. The dryer is optionally an impingement dryer or conventional dryer. The freezer is optionally an individual quick-freeze freezer (e.g. continuous belt freezer and freezing tunnel).

The present invention can be applied generally to all root vegetables suitable for frying. Root vegetable products include products made from root vegetables such as potatoes, yam, carrots and beets. The most common par fried root vegetable products are made from potatoes and the following description primarily refers to potato products. It will be readily apparent that parameters may be adapted depending on the type of potato variety used, since different varieties have different contents of sugars and other solids. It will also be readily apparent that one can adapt the potato methods and apparatus to other root vegetables.

In an embodiment of this invention, raw potatoes are typically subjected to preliminary steps that may include one or more of washing, peeling, trimming and inspecting for defects. After the preliminary steps, the raw potatoes are formed into potato products (e.g. cut potatoes) such as French fries produced from potatoes according to well-known methods. An example of a suitable sized cut would have a cross-section dimension from about 3/16 to 1.5 inch square and rectangular in each of width and height and having various combinations of lengths. The methods described herein are also applicable to other more special cuts, for instance, helical cuts, spiral cuts, crinkle cuts, concertina cuts, waffle cuts, lattice cuts, cube cuts, wedges, dollar chips, slices, triangle fries, crescent cuts and many other shapes. The methods described herein are also applicable to formed products from potatoes, such as tots, croquettes, square and round patties and hash browns typically made from pieces of potato and other ingredients mixed and formed to make specialty (byproduct) potato products. Processed components, such as starches are optionally used to make a dough that can be extruded into various shapes. Thus the term "potato products" refers to any of these and other cut shapes or products formed from potatoes to which the method is usefully applied. The term "potato products" is further defined below by reference to the stage of processing of the potato products, such as "blanched potato products" used to refer to potato products after they have been blanched, but before they are par fried. Root vegetable products are prepared in a similar manner.

Embodiments of the present invention will be further described by examples using potato products. FIG. 1a shows a block diagram of an embodiment of the invention. After the potatoes are peeled, cut and washed, the potato products are typically subjected to a blanching step 10 to produce a blanched potato product. Blanching partially cooks the potato products, assists in controlling reducing sugars and stops enzyme actions which can cause loss of flavour, colour and texture. The blanching step 10 typically consists of scalding the potato products in hot water, steam or frying oil for a short time. In one example of blanching, the potato products (19/64" square) are immersed in water at 65-85° C. for about 5-20 minutes. This blanching step 10 optionally causes a weight loss of about 2% in the potato products compared to the weight at the start of the step due to the loss of some of the potato solids to the water by leaching process. Blanched root vegetable products are prepared in a similar manner.

The blanched, potato products are then optionally subjected to a pre-fry drying step 12 to reduce moisture content. Drying is optionally done in an oven with heat and humidity control. The pre-fry drying step 12 changes the texture of the product by making a continuous dried layer called a 'skin' (also referred to as developing external texture) on the product prior to frying. The pre-fry drying step 12 removes some of the moisture captured from the blanching step 10 before a par frying step 14 to reduce oil absorption and degradation of the frying medium. This reduces the amount of time, oil and size of equipment needed for the par frying step 14.

Figure 1B:
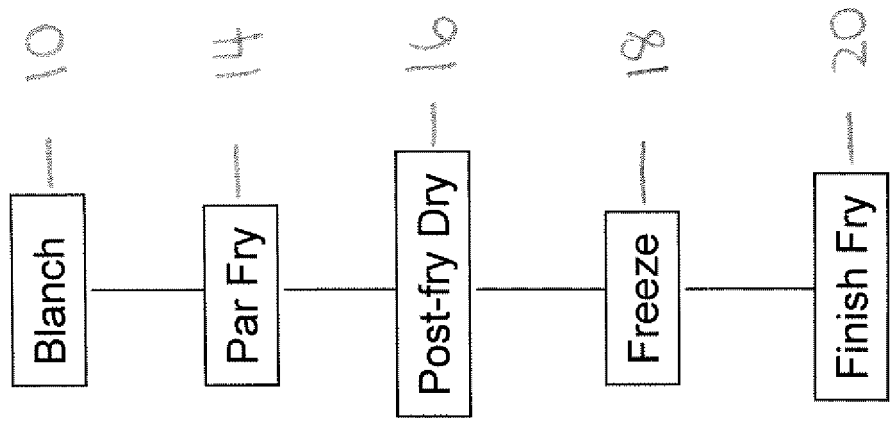

The pre-fry drying step 12 may be omitted, for example, if making a product that does not require drying (e.g. low-solids French fries or fresh-cut/homestyle French fries). The process of the present invention without the pre-fry drying step 12 is illustrated in the block diagram of FIG. 1b.

The potato products are preferably blanched in blanching step 10 just prior to the pre-fry drying step 12 so that the blanched potato products are still hot when the pre-fry drying step 12 begins, and moisture removal is facilitated. This pre-fry drying step 12 is controlled so that approximately 10-12% of the weight (relative to the weight at the start of this step) of the potato products is removed as moisture. Moisture removal can vary by product from 5-20% by weight depending upon the desired quality attributes for a given product. Pre-fry drying step 12 conditions typically provide a moisture removal rate of between 0.5-1.2% weight loss per minute, for example, about 1% weight loss per minute. Drying conditions produce enough moisture removal to dry the product without causing blistering or case hardening. For example, if this pre-fry drying step 12 reduces the moisture content by about 10% by weight then the solids percentage by weight may increase to 10%. The potatoes are dried at 35-100° C., typically 55° C. at a relative humidity of about 40-80%, typically 75% for about 5-20 minutes, typically 15 minutes. The variables for the drying conditions are dependent on the type of dryer used for this pre-fry drying step 12. A dryer that holds a product for 5-8 minutes requires drying conditions that are different than a dryer that holds a product for 20 minutes in order to obtain an identical resulting weight loss in both dryers. A smaller dryer unit requires more heat and lower humidity levels compared to a larger dryer in order to obtain adequate moisture removal within a given time.

After the pre-fry drying step 12, the pre-fry dried potato products are then contacted with oil in a par frying step 14 to produce a par fried potato product. Par frying step 14 or "partial fry" is the cooking stage where the potato products are partially cooked in oil. Par frying step 14 includes any cooking method that partially cooks the potato products in oil, including immersion of potato products in oil, and spraying and coating potato products with oil and heating at high temperatures.

In an embodiment of the par frying step 14, the processing parameters are controlled to produce a par fried potato product having a further weight loss of between 15-30% (relative to the weight at the start of this step) and preferably a weight loss of 20-25%. Par frying typically causes very rapid weight loss, for example, at a rate of about 25% weight loss/minute. Total moisture weight loss at this point is a combination of the pre-fry dry step 12 weight loss and the par fry step 14 weight loss. Total weight loss after par frying step 14 is optionally 20-50% by weight (irrespective of whether a pre-fry dry step 12 is used). The potato products are typically par fried by immersion in oil to achieve this weight. In preparing a product for a food service restaurant (i.e. for a quick serve restaurant product) a suitable par frying temperature is optionally between 170-200° C., more preferably 175-195° C., and typically 185° C. Time can vary from 30-90 seconds, more preferably 30-60 seconds, typically 50 seconds. To obtain the same endpoint without a pre-fry drying step 12, weight losses in the par frying step 14 have to be increased to obtain the desired total weight of the par fried product. Other suitable par frying conditions will be readily apparent to those skilled in the art. Other par fried root vegetables are prepared in a similar manner.

After the par frying step 14, the potato products are then further dried in a post-fry drying step 16 to reduce moisture content in a post-fry dryer (e.g. oven) with heat and humidity control. This step produces a rapid reconstitution potato product capable of being cooked (finish fried) in 90 seconds or less, preferably 60 seconds or less. In the post-fry drying step 16, more drying force is required to remove moisture from the product because the product is becoming more dried and has an oil coating from the par frying step and optionally a skin from the pre-fry drying step that creates a barrier that reduces (impedes) moisture removal. The potato products are preferably subjected to par frying step 14 just prior to this post-fry drying step 16, so that the potato products are still hot when the post-fry drying step 16 begins, and moisture removal is facilitated. Par fried potatoes are typically moved to the post-fry drying step 16 within seconds (for example, less than 15, 30 or 60 seconds) or minutes after the par frying step 14. The methods are typically used in a continuous process (i.e. the par frying step and the post-fry drying step are continuous). The various steps in the process are typically performed consecutively so that each step follows shortly (i.e. usually starting in less than 5, 15, 30 or 60 seconds) after the prior step. This allows for rapid processing of root vegetables to be transformed into root vegetable products ready for shipping from a production facility. The present invention does not require that products be stored during mid-processing, for example frozen storage, and then taken out of storage for further processing before shipping from the production facility.

Drying equipment used for the post-fry drying step 16 typically provides even heat and humidity control to the product surface, for example, by circulating air in sections of alternating direction or by transferring product regularly to another belt to turn the product over thereby exposing areas that have not been in contact with the heated air. In this manner a very even moisture loss will be obtained over the drying retention time. Moisture is preferably removed at a rate which does not exceed the products' ability to pass moisture from its surface (one should wick moisture without desiccating the potato surface and causing cells to collapse). Use of this rate prevents what is called case hardening, which is a drying process that damages the cut product surface by fast drying that forms a barrier on the outside of the potato causing reduced permeability to moisture and impeding further moisture evaporation. Case hardening produces a blistered French fry surface and a tough, chewy external surface that does not have good eating characteristics.

This post-fry drying step 16 achieves the desired moisture content removal without the negative effects of extended frying. The lower moisture content in the post-fry dried potato products (i.e. the rapid reconstitution potato products) after the post-fry dry step 16 has the advantage of reducing the final finish frying time because less moisture is required to be removed to reach the final moisture content of a cooked product. The post-fry drying step 16 does not slow down the line rate. The post-fry dryer is typically added to the line and does not cause pre-fry drying or par frying times to be extended to a point whereby line rate reductions are needed to manufacture the product.

In this post-fry drying step 16, the processing parameters are controlled to produce a rapid reconstitution potato product optionally having a further weight loss of 5-25%, and more preferably a weight loss of 10-20% such as about 15% (relative to the weight at the start of the post-fry drying step). Total weight loss after the post-fry drying is optionally 30-75%, 40-75%, 50-75%, 60-75%, 65-75%, 68-72%, or 70-75% (for example, at least: 40%, 50%, 60% or 70%). Higher weight loss % provides more rapid reconstitution. After the post-fry dry step 16, the potato products, when French Fries, typically have a moisture content between 51-59%, optionally 53-57%. After the finish cooking step, the potato products, when French Fries, typically have 40-70% moisture, optionally 42-45% moisture. After the finish cooking step, the potato products, when potato chips, typically have 2-3% moisture. For other root vegetables, a moisture content between 25-65% may be achieved depending on the desired texture and use. A conventional potato product would have a total weight loss between 20-30%. In one embodiment, the potatoes are dried for 5-30 minutes, typically 20 minutes, preferably 15-25 minutes at a temperature between 50-120° C., typically 55-70° C. and at a relative humidity of about 40-80%, typically 60%-75%. The time and temperature varies considerably based upon the product dimensions as they dictate the rate at which moisture may pass while avoiding case hardening effects. An advantage of using the invention to produce potato products having weight loss in this range is that the invention uses less par frying and preserves potato flavour. The methods of the invention also reduce colour mottling and variation and produce a desirable texture. The post-fry drying step also results in a product with reduced acrylamide because it is fried for a shorter reconstitution time.

Thus, the invention also relates to methods of reducing acrylamide in a fried root vegetable product, particularly a fried potato product by carrying out the steps of the invention as described in this application. The levels of acrylamide in the cooked potato product are lower compared to the levels in a similar product that has not been treated with the methods of the invention. Thus the invention relates to a method for producing reduced acrylamide rapid reconstitution root vegetable products from blanched root vegetables, comprising par frying the blanched vegetables at a par frying temperature; next applying heat and humidity for drying the vegetables at a dehydrating temperature to produce the reduced acrylamide rapid reconstitution root vegetable products. The root vegetable products of the invention have acrylamide levels below detection limits (i.e. <30 parts per million (ppm)) when acrylamide is measured after the post-fry drying step and before a finish cooking step. The root vegetable products of the invention have acrylamide levels between 70-120 ppm when acrylamide is measured after finish cooking the root vegetable products. The method optionally further comprises administering glycine and/or asparaginase to the food product prior to the final preparation of the product. The food product optionally comprises a potato product, such as a French fry, a potato chip, an oven baked potato, rosti, a potato crisp, a potato cake or a potato stick. The glycine (0.1 to 1.5%, optionally 0.3-0.8%) and asparaginase (300 to 2000 ASNU/kg of strips, optionally 500-1300 ASNU/kg of strips) are administered in an aqueous solution by a method such as dipping, coating, spraying, dusting or soaking.

As compared to the pre-fry drying step 12, the conditions above for the post-fry drying step 16 show an increase in retention time, temperature and lower humidity conditions to achieve the endpoint weight losses required for this process step and produce the rapid reconstitution product. For example, the moisture removal rate is optionally between 0.8-3% weight loss per minute, 0.8-2% weight loss per minute and more typically between 1-1.5% weight loss per minute for the post-fry drying step 16. This moisture removal rate is chosen to avoid creating variability in quality and texture in the final product due to uneven drying conditions or uneven rates of moisture removal. As a comparison, the moisture removal rate during frying is approximately 25% weight loss per minute which is significantly faster than the moisture removal rate of the post-fry drying step 16. However, the slower post-fry drying rate of moisture removal avoids the negative effects caused by frying.

After the post-fry drying step 16, the potato products are optionally cooled and frozen in a conventional manner in a freezing step 18, for example, by cooling them to a temperature of about −5 to −20° C. such as on a continuous belt freezer and freezing tunnel. The frozen product may then be packaged, stored and shipped. The freezing step 18 may be eliminated for products that have long shelf life or for products that are intended to be finish cooked shortly after the post-fry drying step. Freezing may be avoided and replaced with cooling for what is termed "chilled French fries" or "fresh fries."

Figure 1C:
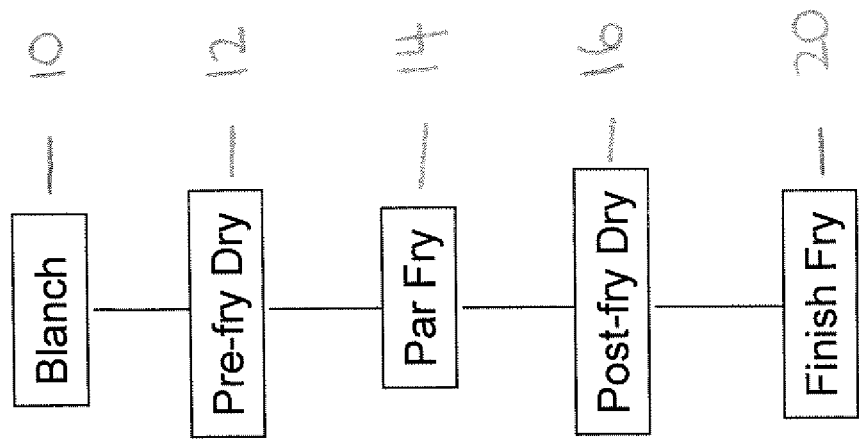

When the potato products are ready for consumption they are finish cooked, for example by frying, baking, or other forms of suitable heating, to cook the potato products to a condition suitable for consumption by the end user. The par fried potatoes are optionally finish cooked either from the frozen state after the freezing step 18 or directly from the post-fry drying step 16. FIG. 1*c* shows a block diagram of one embodiment of the process of the present invention where the freezing step 18 is removed. Frozen product can also be thawed before reconstitution frying to assist the frying step by further reducing cooking times.

The time and temperature for finish cooking the par fried products of the present invention will vary depending upon the type of the root vegetable, the quantity of the root vegetable, the shape and size of the root vegetable, the initial temperature, and the method of cooking.

In one embodiment, the par fried potato products are finish fried in a finish frying step 20. In the finish frying step 20, the potato products are optionally fried in oil at 165-190° C., typically 170-180° C. for 45-90 seconds, such as 75 seconds. Alternatively, the par fried potato products may be finish cooked in a conventional home baking oven. In a conventional home baking oven the cut potato products may be baked at 120-260° C., more typically 170-180° C. for 3-10 minutes, typically 5 minutes to produce a product in much shorter cooking times with final attributes usually seen in products cooked under similar methods with more than 2-4 times more cooking time.

Figure 2A:
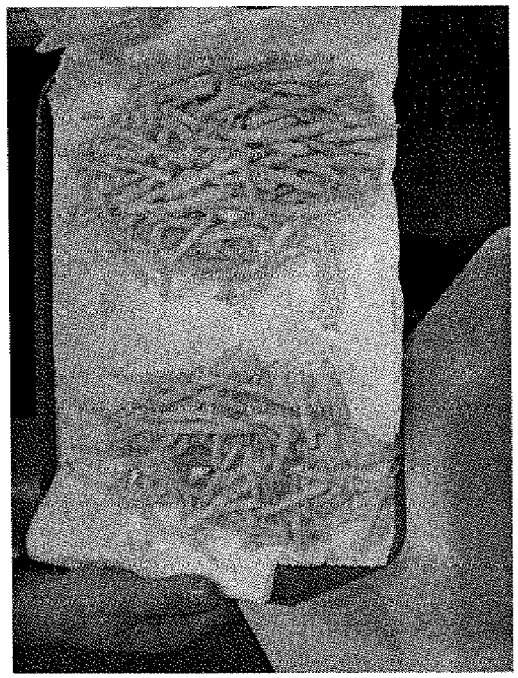
FIGS. 2a and 2b are photos showing cooked French fries prepared in accordance with embodiments of the present invention (left) and French fries prepared in accordance with the prior art two-step par fry process (right)
Figure 2B:

A reduced finish frying time of, for example, 45-90 seconds for potato products provides advantages over prior methods of making French fries. The shorter finish frying time and consequently shorter period of exposure of the potato products to high temperatures produces better potato flavours due to less loss of volatiles and nutrients, assuming that these attributes were not previously removed from the product when removing moisture, for example by extra par frying or retention time. This adds flavour to the final cut potato product, more consistent brighter golden colours due to less caramelization of the sugars, reduced colour mottling and variation due to shorter exposure to hot frying temperatures and thus less opportunity for scorching of the potato surface. The French fries made in accordance with the process of the present invention have less mottling and variation compared with French fries made from a conventional process (FIGS. 2*a* and 2*b*). The final product produced according to this invention also has better taste qualities such as a thin crisp shell with a tender texture, a mealy inner core and stronger potato flavours. Another benefit of the invention is that one can now produce French fries from higher sugar content potatoes. Typically, low sugar potatoes are preferred for frying to reduce color variations and mottling that occur when sugars brown during frying. Thus, the process of the invention, by reducing frying time, allows use of a wider range of potato and vegetable starting materials which provides for greater flexibility.

The post-fry drying step 16 of this present invention, in addition to providing a product having superior internal and external texture characteristics as compared to present processes, also enables the production of French fries with considerably less energy consumption and less use of oil than is required with potato products produced without the final drying step. The shorter finish frying step reduces oil waste in the restaurant, requires less energy and increases the frying capacity of fryers in the restaurant to produce cut potato products. The reduced frying times provide speed and convenience to the end user.

In one embodiment, conventional French fry cutting and blanching is performed on a 0.290 inch (¼ inch) shoestring cut. A dryer is set up at 50° C. at 70% relative humidity for about 14 minutes to produce a weight loss in the range of about 10-12%. The product is par fried for 45 seconds at 180° C. to provide a weight loss of about 19-22%. The product is put in a dryer (post-fry dryer) for 20 minutes at 100° C. and 60% relative humidity to produce a weight loss of about 17-21%. The product is then frozen. The frozen product is reconstituted in 60-90 seconds at from 168-182° C. (335-

360° F.). Reconstitution for 75 seconds at 174° C. (345° F.) with a final weight loss of about 35% gives final product attributes of improved potato flavour, significant reductions in colour variations and mottling and desirable internal and external texture attributes. The process can be readily adapted by modifying time, temperature and humidity parameters for different sizes and customer requirements for color and texture. The product exceeds the quality of the conventional product cooked for 2-3.5 minute retention times.

Figure 1D:
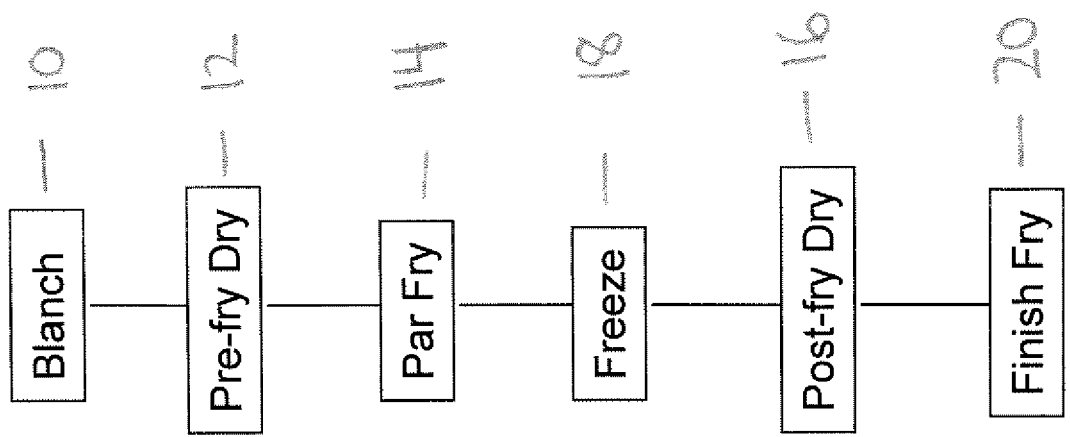
Figure 3:
FIG. 3 is a photo showing an embodiment of the post-fry dryer drying French fries.

The invention is useful for preparing product for retail store sale or for restaurant sale. In an embodiment of the process of the invention, the post-fry dry step 16 and finish fry step 20 can be carried out at a restaurant or other reheating site. FIG. 1*d* shows a block diagram of the process of this embodiment of the present invention where the par frying step 14 and freezing step 18 are carried out prior to the post-fry drying step 16. In this embodiment, conventional frozen par fried products can be post-fry dried at a restaurant, or other reheating site. In this embodiment of the post-fry drying step 16, the par fried product is placed in a drying oven to heat and remove moisture from the product in a controlled manner, with heat, circulated air and humidity control, to obtain the desired weight loss to allow for a reduced frying reconstitution time. The post-fry drying of the product after par fry and freezing produces a similar effect to that obtained where the process of the invention is carried out in a plant setting where the freezing step 18 is carried out after the post-fry dry step 16. One example of a post-fry dryer with heat and humidity control that can be used in a restaurant site is shown in FIG. 3.

The present invention also provides a new method of preparing and serving French fries that will improve product quality and reduce waste. Currently, in a restaurant setting, multiple portions of root vegetables such as French fries are cooked at the same time. It has typically been necessary to cook an oversupply of French fries because customers often will not want to wait for 2-3 minutes for a single portion of French fries to be cooked. A fast-food restaurant also does not wish to have long line ups of customers waiting for food to be cooked. As a result, the oversupply of cooked French fries are held in their frying basket or transferred to a holding container where they remain until they are served to a customer. If the French fries are not all served promptly, they get cold which is unacceptable for customers. Reheating cold French fries after finish frying is also undesirable so typically a heating lamp or other heating device is used to keep the cooked French fries warm until they are served to a customer. However, the quality of the French fries is reduced if they are kept under a heat source for a prolonged period of time. Thus, if the oversupply of French fries is not sold quickly, restaurants are faced with the problem of either serving customers a lower quality product or discarding the older product. The present invention overcomes this problem by providing a rapid reconstitution root vegetable product, such as rapid reconstitution French fries, produced according to methods of the invention. For example, since rapid reconstitution French fries cook so quickly, it is possible to prepare smaller portions of French fries because subsequent portions can be prepared quickly as needed, without causing bottlenecks of customers waiting for French fries. As well, rapid reconstitution French fries can even be cooked in an individual size portion since each customer would only have to wait a short time, such as one minute, for the French fries to cook instead of the current 2-3 minutes using conventional French fries. Thus, the invention relates to a method of preparing a cooked portion of root vegetable product, such as French fries, comprising:

providing a single portion (or a plurality of single portions) of rapid reconstitution root vegetable product (i.e. prepared according to a method described in this application), for example, a portion size intended to be a single serving such as a small, medium, large or extra large serving. This serving is optionally a 10 g, 25 g, 40 g, 50 g, 75 g, 100 g, 200 g or 250 g serving or a portion amount falling in a range between two of the aforementioned masses. The portion is optionally provided in a single package or readily dispensed from a larger package;

finish frying the single portion of the rapid reconstitution root vegetable product, for example, for less than 90 seconds or less than 60 seconds; and packaging the finish fried rapid reconstitution root vegetable product after finish frying for service to a customer (e.g. placing the finish fried product in a container such as a box, bag, bowl or plate made of a material such as styrofoam, glass, plastic, paper or cardboard). In one embodiment, the single portions are pre-packaged and the product may be removed from the package or cooked in the package (i.e. package is permeable to oil). Packaging for service to a customer optionally means placing the product in a container (e.g. bag or box) for take-out or placing the product on a tray.

In one embodiment of the method, a customer provides a request for a single portion (or a plurality of single portions) of fried root vegetable to a food service host (e.g. waiter or waitress) and a food service cook then performs the aforementioned method steps comprising providing a single portion of rapid reconstitution root vegetable product, finish frying the single portion of the rapid reconstitution root vegetable product, and packaging the finish fried rapid reconstitution root vegetable product after finish frying. The request is optionally made at a food service counter or drive through section and the product is delivered by a food service host to the customer at the counter, a table or drive through section. One or more persons may provide the functions of food service host or cook.

Embodiments of the present invention are described below with reference to the examples. The examples are illustrative and are not intended to limit the scope of the invention.

EXAMPLE 1

Frozen commercial ¼ inch square par fried potato products (cut potato pieces in the form of French fries) were used in this example. This example shows that processes of the invention may be applied to frozen French fries produced by conventional methods. Of course, it will also be readily apparent that a freezing step may be omitted entirely or carried out only after a post-fry drying step. As an illustration, a typical process for producing frozen French fries could include peeling, washing, trimming and cutting axially to form cut potato pieces of ¼ inch square cross-section. The cut potato pieces are then blanched in hot water or steam and partially dried in a pre-fry dry step with hot air such that the potato pieces are reduced in weight, for example, by about 10% and have a corresponding moisture content reduction of about 10%. The partially dried cut potato pieces are then par fried in oil for using par frying conditions such as about 35-55 seconds at 180-185° C. The par fried cut potato pieces are then cooled and frozen in a blast freezer, for example, at −25° C. and packaged. The par fried cut potato pieces typically have a moisture content of about 64% and a fat content of about 6% and total solids of about 36%.

For example 1, about 680.0 g of the frozen par fried cut potato pieces were placed on a tray and further processed by drying in the final drying step in a preheated convection oven, with a pan of water for maintaining humidity level, for 15 minutes at 250° F. (121° C.). The resulting dried cut potato pieces weighed 599.5 g which amounted to a weight loss of 11.8%. The dried cut potato pieces were then finish fried for 1.5 minutes at 335° F. (168° C.). The resulting fried cut potato pieces weighed 457.0 g which amounted to a further weight loss of 23.8%. The total weight loss for the final drying step and the finish frying step was 32.8%.

EXAMPLE 2

About 680.5 g of the same frozen par fried cut potato pieces used in Example 1 were further processed by drying in the final drying step in a preheated convection oven, with a pan of water for maintaining humidity level, for 15 minutes at 250° F. (121° C.). The resulting dried cut potato pieces weighed 590.5 g which amounted to a weight loss of 13.2%. The dried cut potato pieces were then finish fried for 1.0 minute at 345° F. (174° C.). The resulting fried cut potato pieces weighed 478.0 g which amounted to a further weight loss of 19.1%. The total weight loss for the final drying step and the finish frying step was 29.8% (this weight loss is additional to the weight loss that occurred with factory prior to frying of the frozen commercial French fries).

EXAMPLE 3

About 680.5 g of the same frozen par fried cut potato pieces used in Example 1 were further processed by drying in the final drying step in a preheated convection oven, with a pan of water for maintaining humidity level, for 20 minutes at 250° F. (121° C.). The resulting dried cut potato pieces weighed 558.5 g which amounted to a weight loss of 17.9%. The dried cut potato pieces were then finish fried for 75 seconds at 345° F. (174° C.). The resulting fried cut potato pieces weighed 459.0 g which amounted to a further weight loss of 17.8%. The total weight loss for the final drying step and the finish frying step was 32.5%.

EXAMPLE 4

About 680.5 g of the same frozen par fried cut potato pieces used in Example 1 was further processed by drying in the final drying step in a preheated convection oven, with a pan of water for maintaining humidity level, for 15 minutes at 250° F. (121° C.). The resulting dried cut potato pieces weighed 560.5 g which amounted to a weight loss of 17.6%. The dried cut potato pieces were then finish fried for 75 seconds at 345° F. (174° C.). The resulting fried cut potato pieces weighed 455.8 g which amounted to a further weight loss of 18.7%. The total weight loss for the final drying step and the finish frying step was 33.0%.

EXAMPLE 5

About 680.5 g of the same frozen par fried cut potato pieces used in Example 1 were further processed by drying in the final drying step in a Henny Penny Smart Cooking System (SCS Model) Model SCE 061 with relative humidity set at 75%, fan speed set at the $4^{th}$ setting, for 20 minutes at 250° F. (121° C.). This cooking system has air temperature, time and humidity controls and therefore allows greater control over the moisture removal rate. The product was loaded in its frying basket into the cooking system (see e.g. FIG. 3). The resulting dried cut potato pieces weighed 585.5 g for a total weight loss of 14.0%. The dried cut potatoes were then finish fried for 65 seconds at 335° F. (168° C.). The resulting fried cut potato pieces weighed 477.5 g which amounted to a total weight loss of 29.8% from the weight of the potato products prior to the drying step.

EXAMPLE 6

About 680.0 g of the same frozen par fried cut potato pieces used in Example 1 were further processed by drying in the final drying step in a Henny Penny Smart Cooking System (SCS Model) Model SCE 061 with relative humidity set at 75%, fan speed set at the $4^{th}$ setting, for 25 minutes at 250° F. (121° C.). The resulting dried cut potato pieces weighed 544.5 g which amounted to a weight loss of 19.9%. The dried cut potato pieces were then finish fried for 65 seconds at 335° F. (168° C.). The resulting fried cut potato pieces weighed 459.5 g which amounted to a total weight loss of 32.4% from the weight of the potato products prior to the drying step.

EXAMPLE 7

About 681.5 g of the same frozen par fried cut potato pieces used in Example 1 were further processed by drying in the final drying step in a Henny Penny Smart Cooking System (SCS Model) Model SCE 061 with relative humidity set at 75%, fan speed set at the $4^{th}$ setting, for 20 minutes at 250° F. (121° C.). The resulting dried cut potato pieces weighed 575.0 g which amounted to a weight loss of 15.6%. The dried cut potato pieces were then finish fried for 75 seconds at 335° F. (168° C.). The resulting fried cut potato pieces weighed 465.5 g which amounted to a total weight loss of 31.7% from the weight of the potato products prior to the drying step.

EXAMPLE 8

About 679.5 g of the same frozen par fried cut potato pieces used in Example 1 were further processed by drying in the final drying step in a Henny Penny Smart Cooking System (SCS Model) Model SCE 061 with relative humidity set at 75%, fan speed set at the $4^{th}$ setting, for 25 minutes at 250° F. (121° C.). The resulting dried cut potato pieces weighed 559.0 g which amounted to a weight loss of 17.7%. The dried cut potato pieces were then finish fried for 75 seconds at 335° F. (168° C.). The resulting fried cut potato pieces weighed 448.0 g which amounted to a total weight loss of 34.1% from the weight of the potato products prior to the drying step.

FIGS. 2a and 2b shows a comparison of the French fries between French fries made in accordance with the processes of the invention as illustrated in the Examples 1-8 which are shown on the left side of the photo and the French fries made from a conventional two-step par fry process which are shown on the right side of the photo. The French fries made in accordance with the process of the present invention appear lighter and with less mottling and variation compared with French fries made from a conventional process. The final product produced according to this invention also has better tasting qualities such as a thin crisp shell with a tender texture, a mealy inner core and stronger potato flavours.

EXAMPLE 9

In this example, 1423 g of 9/32 strips were blanched for 15 minutes at 75° C. and placed in a dip of 0.8% SAPP/0.5% dextrose at 65° C. for 60 sec, followed by a dry time of 10 minutes at 45° C. (weight loss: 7%). Following a rest of 4 minutes at room temperature, strips were par fried for 70 seconds at 185° C. (par fry weight loss: 24%). Strips were subjected to the post-fry drying step before freezing to −20°

C. (8 minutes chill/12 minutes freeze). About 977.8 g of par fried material was dried between 30 and 27 minutes using a dual-zone industrial dryer in static mode set between 110 and 125° C., preferably 115° C., 15% humidity, with two pauses of one minute to flip the strips. As noted previously, dryer conditions, such as temperature and relative humidity are readily adjusted by one of skill in the art according to the dryer used, so the relative humidity is lower in this example than in Example 8. The resulting dried cut potato pieces weighed 634 g which amounted to a weight loss of 35.2% and drying rate of 12.5 g moisture/min (during a continuous process, parfried material would be routed through a high temperature, ideally impingement type dryer independent of the standard process dryer). The dried potato pieces were then chilled and frozen, as described in example 1. The resulting frozen potato pieces weighted 605 g. The frozen dried cut potato pieces were then finish fried for 65 seconds at 168° C. The resulting fried cut potato pieces weighed 546 g which amounted to a further weight loss of 9.8% and a finish solids of ~58%. Total % weight loss from par fry, post-fry drying and finish fry was 78%.

As a variant to this process, 9/32 par-fried frozen strips were subjected to the secondary dehydration step at similar conditions as described above and then refrozen before it is finished fried for 65 seconds at 168° C. Tubers were preheated before cutting by placing in water between 54° C. and 56° C. for 38 min. Blanching was at about 80-85° C. for 8-9 min. Pre-fry drying occurred between 47-54° C. for about 14 min. Par Frying was done at 180-190° C. for 60 sec. Product was frozen in 8 min 45 sec to a discharge temperature of −22° C. Product was then post-fry dried between 30 and 27 minutes using a dual-zone industrial dryer in static mode set between 110 and 125° C., preferably 115° C., 15% humidity. Weight loss was about 31% at a drying rate of 11 g moisture/min. The dried potato pieces were then refrozen to −23° C. The frozen dried cut potato pieces were then finish fried for 65 seconds at 168° C. Total % weight loss from par fry, post-fry drying and finish fry was about 75%.

EXAMPLE 10

Potato products were produced as described in Example 9 using the rapid reconstitution method and were analyzed for acrylamide levels. The acrylamide levels in the rapid reconstitution products were compared to acrylamide levels in potato products produced from a conventional non-rapid reconstitution method that did not include a post-fry dry step. In the rapid reconstitution process, the potato products produced from Example 9 were chilled to 25° C., refrozen to −20° C. and the frozen finish fried product was analyzed for acrylamide. For the non-rapid reconstitution potato products, the products were produced using the process as described in Example 9 until the par frying stage. The strips were then cooled to 10° C. and frozen to −20° C. The frozen strips were finished fried at 168° C. for 3 minutes, cooled to 25° C., refrozen to −20° C. and the frozen finished fried products were analyzed for acrylamide levels. Acrylamide levels for potato products produced from the rapid reconstitution method were between 70-120 ppb (i.e. three samples were measured at 70, 80, or 120 ppb, respectively). The acrylamide levels for the potato products produced from the non-rapid reconstitution method were between 380-390 ppb (i.e. three samples were measured at 380, 390 and 390 ppb, respectively).

The present invention has been described in terms of particular embodiments found or proposed by the present inventors to comprise preferred modes for the practice of the invention. It will be appreciated by those of skill in the art that, in light of the present disclosure, numerous modifications and changes can be made in the particular embodiments exemplified without departing from the intended scope of the invention. All such modifications are intended to be included within the scope of the appended claims.

The invention claimed is:

1. A method for producing rapid reconstitution French fries for reconstitution by finish frying in oil, comprising:
   par frying blanched French fries between 165-190° C., wherein at the end of the par frying step, the French fries have 15-30% weight loss compared to the weight of the blanched French fries;
   next applying heat and controlled humidity for drying the French fries at a dehydrating temperature between 50° C. to 125° C. and a relative humidity between 15% to 80%, producing 0.8-2% weight loss per minute until the French fries have a total weight loss between 40-75%;
   thereby producing the rapid reconstitution French fries for reconstitution by finish frying in oil.

2. The method of claim 1, wherein the dehydrating temperature is between 55° C. to 70° C.

3. The method of claim 1, wherein the French fries are dried at a moisture removal rate comprising between 0.8-1.5% weight loss per minute.

4. The method of claim 1, wherein the moisture removal rate of between 0.8-2% weight loss per minute produces a weight loss of 5-25% in the French fries in the drying step.

5. The method of claim 1, wherein the French fries comprise potato and following drying the French fries have a moisture content between 53-57%.

6. The method of claim 1, wherein the drying step comprises drying the French fries between 5 and 30 minutes.

7. The method of claim 6, wherein the drying step comprises drying the French fries between 15 and 25 minutes.

8. The method of claim 1, wherein the dehydrating temperature removes moisture and causes weight loss in the French fries without browning the French fry surfaces or volatilizing or degrading organic flavour components and causing loss of natural potato flavor.

9. The method of claim 1, wherein the relative humidity is between about 40% to 80% relative humidity and permits moisture removal in a controlled manner from the French fries without case hardening of the French fries.

10. The method of claim 1, wherein the humidity is between about 40% to 80% relative humidity.

11. The method of claim 10, wherein the humidity is between about 60% to 75% relative humidity.

12. The method of claim 1, wherein the drying step reduces the weight of the French fries to produce French fries that have a weight that is 5-25% less than the weight of the French fries at the start of the drying step.

13. The method of claim 12, wherein the French fries have a weight that is 10-20% less than the weight of the French fries at the start of the drying.

14. The method of claim 1, wherein the French fries comprise a vegetable selected from the group consisting of potatoes, yams, carrots and beets.

15. The method of claim 14, wherein the French fries comprise 3/16 inch to 1.5 inch square cut French fries.

16. The method of claim 15, wherein the potatoes comprise 9/32 to 19/64 inch shoestring cut French fries.

17. The method of claim 16, wherein the par frying step comprises frying the French fries for 45-90 seconds.

18. The method of claim 15, wherein the vegetables comprise 3/16 inch to 1/4 inch shoestring cut potatoes.

19. The method of claim 1, wherein the par frying step reduces the weight of the French fries by 15-30% compared to the weight of the French fries at the start of the par frying step.

20. The method of claim 1, wherein the par frying step comprises frying the French fries in oil for about 35-90 seconds at 165-190° C.

21. The method of claim 1, wherein the par frying step comprises frying the French fries in oil for about 35-55 seconds at 180-185° C.

22. The method of claim 1, wherein the drying comprises applying heat by blowing heated air on the French fries.

23. The method of claim 1, wherein the drying comprises applying heat by blowing a heated convection air current on the French fries.

24. The method of claim 1, wherein the drying step comprises applying heat by blowing a first air current and a second air current on the French fries, wherein the first air current and the second air current are blown in alternate directions.

25. The method of claim 1, wherein the drying step further comprises turning the French fries while applying heat.

26. The method of claim 25, wherein turning the French fries comprises moving the French fries from a first conveyor belt to a second conveyor belt.

27. The method of claim 1, wherein the drying step immediately follows the par frying step.

28. The method of claim 1, wherein the drying is free of frying of the cut potatoes.

29. The method of claim 1, further comprising finish frying the French fries in oil for reconstitution to produce cooked French fries.

30. The method of claim 29, wherein the finish frying comprises reducing the moisture content of the French fries to cause a weight loss of 10-40% relative to the weight of the French fries at the start of the finish frying step.

31. The method of claim 30, wherein the finish frying step is preceded by freezing the vegetables.

32. The method of claim 29, wherein the finish frying step comprises frying the cut French fries in oil for about 60-75 seconds at 180-185° C.

33. The method of claim 1, wherein the French fries are frozen during the drying step.

34. The method of claim 1, wherein the French fries are unfrozen during the drying step.

* * * * *